United States Patent [19]

Yoshizawa

[11] Patent Number: 4,596,903
[45] Date of Patent: Jun. 24, 1986

[54] PICKUP DEVICE FOR PICKING UP VIBRATION TRANSMITTED THROUGH BONES

[75] Inventor: Naomi Yoshizawa, Hatano, Japan

[73] Assignee: Pilot Man-Nen-Hitsu Kabushiki Kaisha, Tokyo, Japan

[21] Appl. No.: 604,493

[22] Filed: Apr. 27, 1984

[30] Foreign Application Priority Data

May 4, 1983 [JP] Japan .................. 58-78637

[51] Int. Cl.[4] ............................. H04R 17/02
[52] U.S. Cl. .................. 179/121 C; 179/107 BC; 179/110 A; 367/166; 367/171
[58] Field of Search ........ 179/121 C, 107 BC, 110 A; 367/157, 166, 171

[56] References Cited

U.S. PATENT DOCUMENTS

| | | | |
|---|---|---|---|
| 2,564,562 | 8/1951 | Chess | 367/166 |
| 2,783,449 | 2/1957 | Loofbourrow | 367/166 |
| 3,382,481 | 5/1958 | Baker | 367/166 |
| 4,059,819 | 11/1977 | Mollere | 367/171 |
| 4,150,262 | 4/1979 | Ono | 179/121 C |

FOREIGN PATENT DOCUMENTS 1086723 10/1967 United Kingdom ............ 179/121 C

Primary Examiner—Gene Z. Rubinson
Assistant Examiner—Danita R. Byrd
Attorney, Agent, or Firm—Wenderoth, Lind & Ponack

[57] ABSTRACT

A pickup device for picking up vibration transmitted through bones or solid members in human, in which a piezoelectric element is mounted like a cantilever within a substantially rigid liquid-tight case filled with a viscous liquid in such a way that the free end of the piezoelectric element can vibrate with respect to the liquid-tight case. The viscosity of the viscous liquid ranges from 30 to 10,000 cs so that the sharpness of resonance of the piezoelectric element can be suitably suppressed.

3 Claims, 7 Drawing Figures

PICKUP DEVICE FOR PICKING UP VIBRATION TRANSMITTED THROUGH BONES

BACKGROUND OF THE INVENTION

The present invention relates to a pickup device which is best adapted to pickup high quality audio signals transmitted through bones with a minimum level of noise and without causing howling.

Pickup devices for picking up vibration transmitted through bones of the type in which a piezo-electric element which is supported like a cantilever picks up audio signals transmitted through bones have been well known in the art. For instance, Japanese Patent Publication No. 39763-1978 discloses a pickup device of the type described above. When one inserts such a pickup device into an ear and speaks, the pickup device picks up noise when the surrounding noise level is in excess of 90 dB (A) so that the audio signal cannot be distinctly distinguished from noise. Furthermore, when this pickup device is connected to a loudspeaker, a howling noise is heard very frequently because the audio frequency range includes resonance frequencies of a few orders so that noise whose frequency is close to such resonance frequencies is picked up.

In order to solve the above and other problems encountered in the prior art pickup devices, there has been proposed a method for using a low-pass filter that transmits frequencies lower than the resonance frequencies. However, it is extremely difficult to attenuate only the sensitivity at the resonance frequencies without attenuating the sensitivity of the audio frequency range because the sensitivity of a piezo-electric element which is supported like a cantilever has a high degree of sensitivity to a resonance frequency.

The inventor has proposed the use of a notch filter in order to solve the above-described problem. The use of a notch filter is very effective in decreasing only the peak value of a resonance frequency, but high volume production cannot be attained because pickup devices have their own unique resonance frequencies so that the notch frequency of each notch filter must be matched with the resonance frequency of each pickup device.

SUMMARY OF THE INVENTION

The inventor made extensive studies and experiments in order to solve the problem described above and has succeeded in providing a pickup device for picking up high quality audio signals transmitted through bones with a minimum level of noise and without causing howling by causing the vibration of a cantilever-like piezo-electric element in a viscous fluid of a predetermined viscosity range so that the sensitivity or response at a resonance frequency is attenuated to a given value. More particularly, the present invention provides a pickup device for picking up vibration or audio signals transmitted through bones of the type in which a piezo-electric element is supported like a cantilever (to be referred to as "a cantilever-like piezo-electric element" for brevity in this specification) in a liquid-tightly enclosed case filled with a viscous liquid with a viscosity ranging from 30 to 10000 cs so that the peak resonance level Q of the piezo-electric element in the viscous liquid is lower than 3 when a resonance frequency is in excess of 1.5 KHz.

In a pickup device in accordance with the present invention, a cantilever-like piezo-electric element is enclosed in a liquid-tight case and a supporting member which supports one end of the cantilever-like piezo-electric element is securely attached to the liquid-tight case.

DETAILED DESCRIPTION OF THE INVENTION

Figure 1:
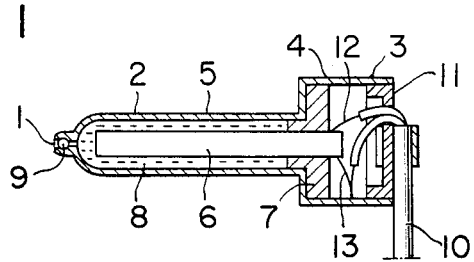
FIG. 1 is a longitudinal sectional view of a first embodiment of a pickup device in accordance with the present invention.

According to the present invention, the resonance frequency of a cantilever-like piezo-electric element must be higher than 1.5 KHz. If the resonance frequency is lower than 1.5 KHz, articulation or intelligibility becomes less than 60% and the sentence intelligibility drops less than 88% so that the function of a pickup device for picking up vibration transmitted through bones is lost. Piezo-electric elements used in the present invention may be made of barium titanate or lead zirconate and it is preferable to use a bimorph cell. One end of a piezo-electric element can be supported like a cantilever or a piezo-electric element can be bonded to one surface of a cantilever made of a metal, plastic, ceramic or the like. As long as a piezo-electric element is supported like a cantilever, the shape of the piezo-electric element is not limited, but it is preferable to use a cantilever-like piezo-electric element in the form of a plate, a rod or wire. The term "piezo-electric element" used in this specification also refers to a piezo-electric element of the type in which a piezo-electric element is bonded to one surface of a metal, plastic or ceramic cantilever.

In general, it is well known that the longer and thinner a cantilever is, the lower the resonance frequency becomes. It therefore follows that a piezo-electric element with a predetermined resonance frequency can be obtained by changing the length, thickness and shape. For instance, in the case of a bimorph cell of the type in which piezo-electric elements are bonded to both surfaces of a metal plate, it is preferable that the length of the metal plate is less than about 30 mm and the thickness is greater than about 0.3 mm.

It is preferable to use a hard material to fabricate a supporting member which supports one end of a piezo-electric element because the supporting member made of a hard material can securely support the piezo-electric element. Furthermore, it is preferable that the supporting member is made of an electrically insulating material. For instance, it may be made of plastic, a metal coated with an insulating material, ceramic or the like. It is further required that the supporting member is not attacked by a viscous liquid which is in contact with the supporting member. One end of a piezo-electric element can be fitted into a recess or hole of the supporting member.

A liquid-tight case into which is encased a cantilever-like piezo-electric element supported by a supporting member may be made of any material such as a metal, plastic, ceramic or the like which is not attacked by a viscous liquid filling in the case. The construction of a liquid-tight case may be such that one end of the case is closed while the other end thereof is open but liquid-tightly closed with a supporting member which may be press fitted, bonded or caulked.

In order to facilitate injecting of a viscous liquid into a liquid-tight case and to prevent the leakage of the viscous liquid from the liquid-tight case, a small hole is formed at one end of the liquid-tight case and after the viscous liquid has been injected into the liquid-tight case, the small hole is liquid-tightly closed with a ball or a plug. It is preferable that lead wires extended from the piezo-electric element are coated with plastic in order to prevent the leakage of a viscous liquid along them. Moreover, depending upon the intended use, the liquid-tight case can be covered with a suitable material.

Figure 5:
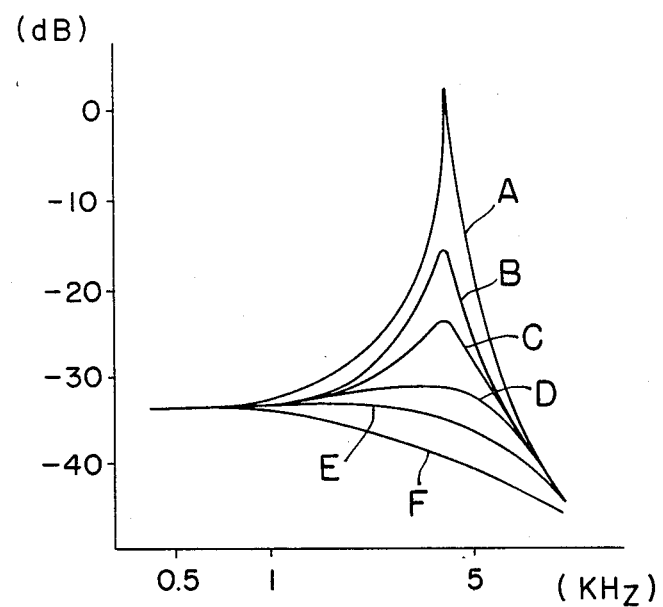
FIG. 5 shows the frequency characteristic curves of pickup devices when no viscous liquid is used and when viscous liquids are used.

After extensive studies and experiments, the inventor found out the fact that when a cantilever-like piezo-electric element is immersed in a viscous liquid, howling is avoided and the noise pickup can be reduced to a minimum so that the audio signal can be distinctly distinguished even when the noise level is high. It was also found out that the higher the viscosity of a liquid, the lower the sharpness of resonance $f_o/\Delta f$ becomes (where $f_o$ is a resonance frequency and $\Delta f$ is a frequency width at which the sensitivity is lower than the sensitivity at the resonance frequency $f_o$ by 3 dB and the sharpness of resonance $f_o/\Delta f$ is referred to as "a Q factor" in this specification). As a result, the performance of a pickup device can be remarkably improved. For instance, when a cantilever-like piezo-electric element whose resonance frequency is 4.3 KHz when the element is not immersed in a viscous liquid, is immersed in various liquids having a viscosity ranging from 10 to 10000 cs, the Q factor is dropped from 29 to as low as 0.3 as shown in FIG. 5. In FIG. 5, the frequency characteristic curve A is that of a pickup device which does not use a viscous liquid and Q is 29. When liquids or silicon oils with viscosity of 10, 100, 500, 1000 and 10000 cs, respectively, are used, the frequency characteristic curves are represented by curves B, C, D, E and F, respectively. The Q factors are 8.0, 3.2, 1.2, 0.7 and 0.3, respectively.

After extensive studies and experiments, the inventor succeeded in providing a pickup device which can distinctly distinguish the audio signal even when the noise level is as high as 100 dB (A) when a piezo-electric element is immersed in a viscous liquid with the viscosity ranging from 30 to 10,000 cs.

The present invention is characterized in that a viscous liquid with a viscosity ranging from 30 to 10,000 cs is used and that the Q factor of a piezo-electric element immersed in the viscous liquid is less than 3.

Figure 6:
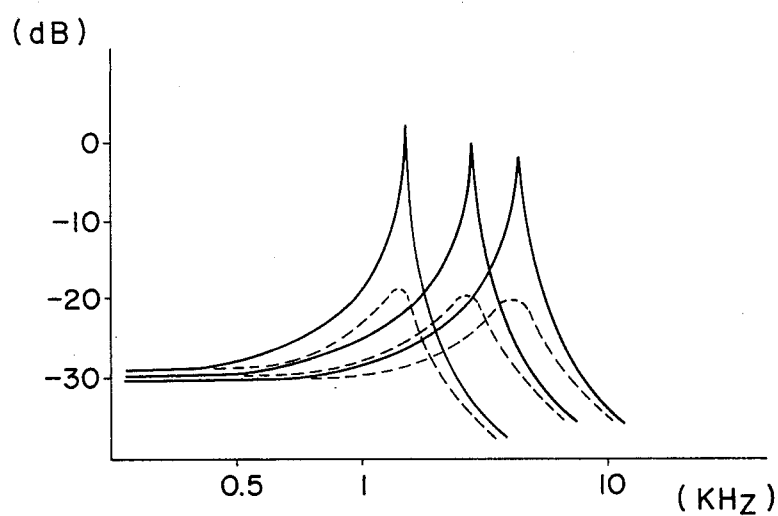
FIG. 6 shows the frequency characteristic curves of pickup devices when no viscous liquid is used and the frequency characteristic curves when Q is 3.

The Q factor of a cantilever-like piezo-electric element is dependent upon the length and thickness of the element. According to the experiments conducted by the inventor, it is found out that the Q factors of cantilever-like piezo-electric elements with a resonance frequency higher than 1.5 KHz are greater than 3 as shown in FIG. 6 (in which the frequency characteristic curves of piezo-electric elements with a Q factor being 3 are shown in dotted lines). Even when a piezo-electric element is securely enclosed within a liquid-tight case and a viscous liquid fills the case so that the Q factor is decreased, noise whose frequency is closer to a resonance frequency is picked up when the Q factor is higher than 3 and howling occurs and sound quality is not satisfactory. It therefore follows that in order to attain the objects of the present invention, the Q factor of a cantilever-like piezo-electric element must be less than 3.

Figure 7:
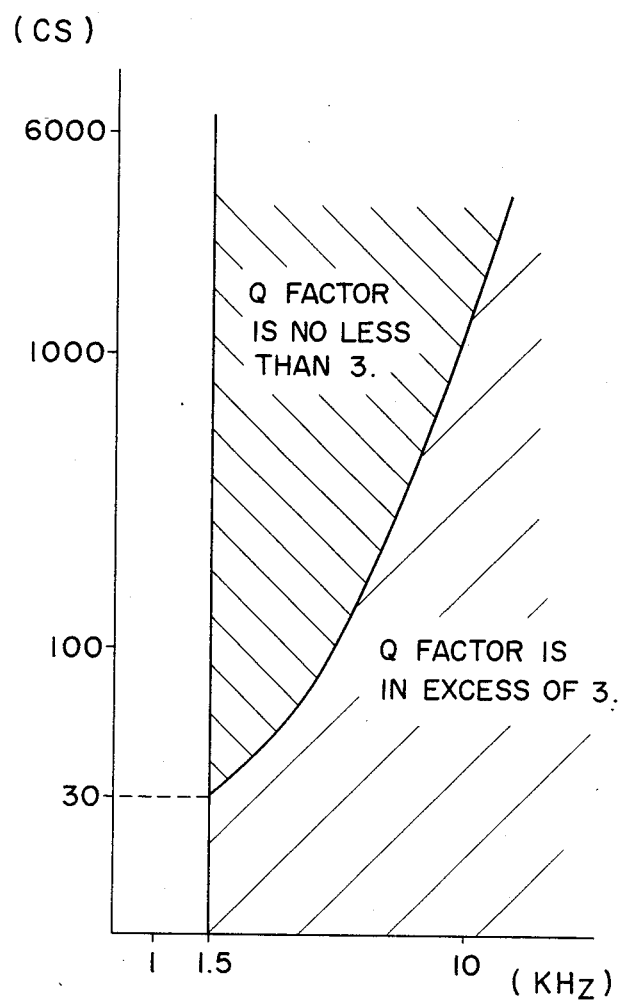
FIG. 7 shows the relationship among the resonance frequency, dynamic viscosity and Q factors.

Various pickup devices are prepared which comprise a cantilever-like piezo-electric element enclosed in a liquid-tight case in such a way that a resonance frequency becomes higher than 1.5 KHz. Various kinds of viscous liquids were injected into the cases so that various Q factors were obtained. FIG. 7 shows the region in which the Q factor is in excess of 3 and the region in which the Q factor is less than 3. As is clear from FIG. 7, in order that a cantilever-like piezo-electric element with a resonance frequency of 1.5 KHz may have a Q factor less than 3, the viscosity of a viscous liquid must be higher than 30 cs. It may be also noticed that the higher the viscosity, the lower the Q factor becomes. However, if the viscosity of a liquid is in excess of 10,000 cs, it becomes difficult to inject the liquid into a case and bubbles are produced so that the frequency characteristic varies. It therefore follows that it is preferable that the viscosity of a liquid used ranges from 30 to 10000 cs.

Viscous liquids which may be used in the present invention may be paraffin cloride, high-molecular plasticizers, liquid surface active agents, glycols, silicon oil, motor oil, other mineral oils, organic solvents such as hydrocarbons or prepolymers such as urethane, epoxy resin or the like. It is preferable that the viscous liquids used in the present invention will not attack a liquid-tight case and other members in contact with the liquids, have less odor and will not change their viscosity in response to the temperature change.

When such viscous liquid fills in a liquid-tight case, a pickup device for picking up vibration transmitted through bones or resilient bodies can be provided.

Only the portion of a cantilever-like piezo-electric element which vibrates may be immersed in a viscous liquid. Alternatively, the whole cantilever-like piezo-electric element, that is, a piezo-electric element and its supporting member, can be completely immersed in a viscous liquid.

The lead wires extended from a piezo-electric element of a pickup device in accordance with the present invention can be connected to an amplifier so that the pickup device can be used as a conventional microphone.

The pickup device in accordance with the present invention may be inserted into an ear or attached to part of a human body so that it may be used as a microphone for picking up the audio signal or voice transmitted through bones. Alternatively, it may be attached to an accessory or the like worn by a man so that it may be used as a microphone which indirectly picks up the audio signal or voice transmitted through bones. Furthermore, the pickup device may be bonded to a desk or a wall so as to pick up the audio signal or vibration transmitted therethrough.

DESCRIPTION OF THE PREFERRED EMBODIMENTS

The preferred embodiments of the present invention will be now described with reference to the accompanying drawings, but it is to be understood that the present invention is not limited thereto.

FIG. 1 shows a first embodiment of a pickup device in accordance with the present invention which comprises a substantially rigid cylindrical brass case 5 consisting of a small-diameter portion 2 having a small hole 1 at one or free end thereof and a large-diameter portion 4 with an open end 3. One end of a piezo-electric element 6 is securely supported by a supporting member 7 and is inserted into the small-diameter portion 2 in such a way that the supporting member 7 is liquid-tightly seated at the bottom of the large-diameter portion 4. A viscous liquid 8 is injected through the small hole 1 into the small-diameter portion 2 and thereafter a ball 9 made of a hard metal such as tungsten carbide is inserted into the small hole 1. The free end of the small-diameter portion 2 is caulked so as to hold the ball 9 in position and to liquid-tightly close the free end. Thus, the case 5 becomes a liquid-tight case.

The open end 3 of the large-diameter portion 4 is closed with a cover 11 with a cord 10 and lead wires 12 and 13 of the cord 10 through the cover 11 connected to the piezo-electric element 6 through FETs and resistors (not shown). The lead wire 13 is soldered to the large-diameter portion 4 and is therefore grounded. In order to ensure the liquid-tightness between the supporting member 7 and the bottom of the large-diameter portion 4, a sealant such as silicon, a potting material, an O-ring or a packing may be used.

Figure 2:
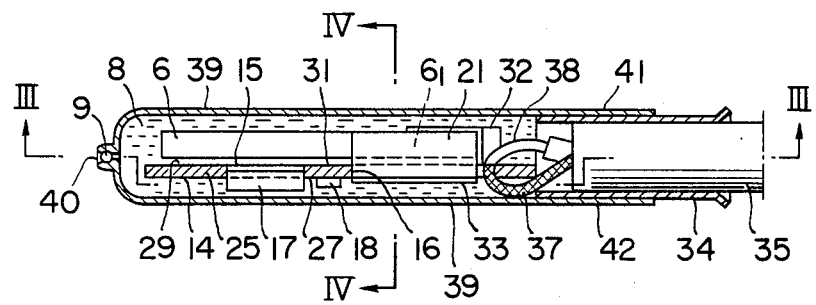
FIG. 2 is a longitudinal sectional view of a second embodiment of the present invention.
Figure 3:
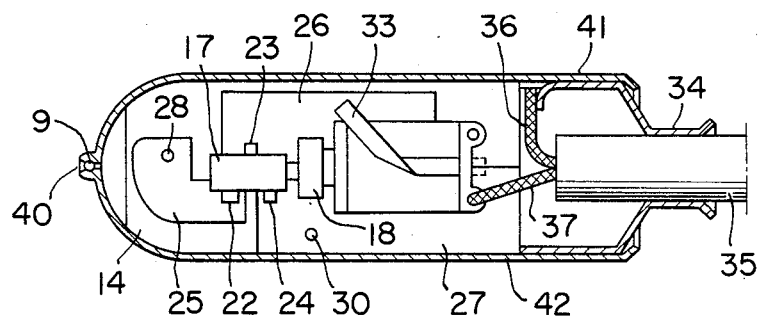
FIG. 3 is a sectional view taken along the line III—III of FIG. 2.
Figure 4:
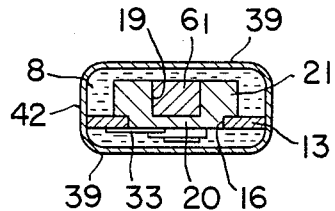
FIG. 4 is a sectional view taken along the line IV—IV of FIG. 2.

In FIGS. 2 through 4 is shown a second embodiment of a pickup device in accordance with the present invention. A base plate 14 is formed with two mounting holes 15 and 16 which are spaced apart from each other by a predetermined distance in the longitudinal direction. A field-effect transistor (FET) 17 is securely mounted in the hole 15 and a resistor 18 is securely bonded or otherwise joined to the undersurface of the base plate 14. A supporting member 21 is formed with a recess 19 and a projection 20 which are extended in the same direction (See FIG. 4) and one end $6_1$ of a piezo-electric element 6 is securely fitted into the recess 19. The piezo-electric element 6 is extended in parallel with the base plate 14 and spaced apart from the upper surface thereof by a predetermined distance. The projection 20 is fitted into mounting hole 16.

The terminals 22, 23 and 24 of the field-effect transistor 17 are connected to the conduction layers 25, 26 and 27, respectively, of the undersurface of the base plate 14. The conduction layers 25, 26 and 27 are electrically isolated from each other. The resistor 18 is bridged between the conduction layers 26 and 27. The conduction layer 25 is connected through a small hole 28 to a conduction layer 29 formed over the upper surface of the base plate 14. In like manner, the conduction layer 27 is connected through a small hole 30 to a conduction layer 31 formed over the upper surface of the base plate 14. Lead plates 32 and 33 which are attached to the upper and lower surfaces, respectively, of the end portion $6_1$ of the piezo-electric element 6 are connected to the conduction layers 31 and 27, respectively.

One shield 36 of a cord 35 carried by a brass cap 34 is soldered to the inner surface of the cap 34 and is therefore grounded. The other shield 37 and a lead wire 38 are connected to the conduction layers 26 and 29, respectively. A filler (not shown) such as epoxy resin fills the cap 34 so that the cap 34 can be made liquid-tight.

A substantially rigid brass case 42 is substantially rectangular in cross section and has flat top and bottom surfaces 39. One end of the brass case 42 is formed with a small hole 40 while the other end thereof is opened as indicated by the reference numeral 41. The base plate 14 is inserted through the open end 41 into the brass case 42 in such a way that the piezo-electric element 6 can vibrate at right angles with respect to the flat top and bottom surfaces 39 of the brass case 42. The side edges of the base plate 14 are forced to press against the inner side wall surfaces of the brass case 42 and the cap 34 is inserted into the open end 41. Thereafter the open end 41 is caulked so that the cap 34 can be securely held in position. Part of the cap 34 is soldered to the open end 41 of the brass case 42 so that the electrical connection can be established therebetween. The space between the open end 41 of the brass case 42 and the cap 34 is filled with an adhesive or the like so that the cap 34 can liquid-tightly seal the open end 41 of the brass case 42.

A viscous liquid 8 is injected through the small hole 40 into the brass case 42 and thereafter a ball 9 made of a hard metal is fitted into the small hole 40. Next the end with the small hole 40 of the brass case 42 is caulked so that the ball 9 can be held securely in position and the brass case 42 is liquid-tightly sealed.

Instead of the ball 9, a plug made of plastic or rubber may be used.

Next some examples of the present invention will be described. Examples 1 through 24 are of the type as shown in FIG. 1 comprising various kinds of piezo-electric elements and viscous liquids.

EXAMPLE 1

One end of a bimorph cell 6 (the product of Fuji Ceramic K.K.) having the length of 8 mm, the thickness of 0.6 mm and the width of 1.5 mm is securely fixed to the supporting member 7. The inner diameter of the small-diameter portion 2 is 2 mm and a silicon oil (the product of Shinetsu Kagaku Kogyo K.K. sold under the trademark KF-96) is injected into the small-diameter portion 2. Example 1 has a Q factor of 2.5.

In Examples 2 through 24, the piezo-electric elements are the products of Fuji Ceramic K.K.; and the silicon oil is the product of Shinetsu Kagaku Kogyo K.K. sold under the trademark KF-96 while the surface active agent is the product of Kao Sekken K.K. sold under the trademark Emulgen 810.

| Example No. | Piezoelectric element thickness (mm) | width (mm) | length (mm) | Viscous liquid kind | viscosity (cs) | Q |
|---|---|---|---|---|---|---|
| 2 | 0.6 | 1.5 | 12 | silicon oil | 50 | 2.2 |
| 3 | " | " | " | silicon oil | 100 | 1.3 |
| 4 | " | " | 9 | silicon oil | 100 | 2.1 |
| 5 | " | " | 12 | silicon oil | 300 | 0.4 |
| 6 | " | " | 9 | silicon oil | " | 0.8 |
| 7 | " | " | 8 | silicon oil | " | 1.2 |
| 8 | " | " | 6.6 | silicon oil | " | 1.7 |
| 9 | " | " | 12 | surface active agent | 550 | 0.3 |
| 10 | " | " | 9 | surface active agent | " | 0.6 |
| 11 | " | " | 8 | surface active agent | " | 0.8 |
| 12 | " | " | 6.6 | surface active agent | " | 1.2 |
| 13 | " | " | 12 | silicon oil | 1000 | 0.3 |
| 14 | " | " | 9 | silicon oil | " | 0.4 |
| 15 | " | " | 8 | silicon oil | " | 0.5 |
| 16 | " | " | 6.6 | silicon oil | " | 0.7 |
| 17 | " | " | 12 | paraffin chloride | 2600 | 0.3 |
| 18 | " | " | 9 | paraffin | " | " |

-continued

| Ex-ample No. | Piezoelectric element | | | Viscous liquid | | Q |
|---|---|---|---|---|---|---|
| | thickness (mm) | width (mm) | length (mm) | kind | viscosity (cs) | |
| 19 | " | " | 8 | chloride paraffin | " | " |
| 20 | " | " | 6.6 | chloride paraffin | " | " |
| 21 | " | " | 12 | silicon oil | 6000 | " |
| 22 | " | " | 9 | silicon oil | " | " |
| 23 | " | " | 8 | silicon oil | " | " |
| 24 | " | " | 6.6 | silicon oil | " | |

Examples 25 through 44 are of the type as shown in FIGS. 2-4 comprising various kinds of piezo-electric elements and viscous liquids.

EXAMPLES 25

A bimorph cell (the product of Fuji Ceramics K.K.) with the thickness of 0.6 mm, the width of 1.5 mm and the length of 12 mm has its one end fixed to the supporting member 21 and is inserted into the brass case 42 with the inside width of 6 mm and the inside thickness of 3 mm. The silicon oil with the viscosity of 50 cs (the product of Shinetsu Kagaku K.K. sold under the trademark KF-96) is injected into the brass case 42. The Q factor is 2.2.

In the following examples, the piezo-electric elements are the products of Fuji Ceramics K.K. and the silicon oil is the product of Shinetsu Kagaku Kogyo K.K. sold under the trademark KF-96 series.

| Example No. | Piezoelectric element | | | Viscous liquid | | Q |
|---|---|---|---|---|---|---|
| | thickness (mm) | width (mm) | length (mm) | kind | viscosity (cs) | |
| 26 | 0.6 | 1.5 | 12 | silicon oil | 100 | 1.3 |
| 27 | " | " | 9 | " | " | 2.1 |
| 28 | " | " | 8 | " | " | 2.5 |
| 29 | " | " | 12 | " | 300 | 0.4 |
| 30 | " | " | 9 | " | " | 0.8 |
| 31 | " | " | 8 | " | " | 1.2 |
| 32 | " | " | 6.6 | " | " | 1.7 |
| 33 | " | " | 12 | " | 500 | 0.3 |
| 34 | " | " | 9 | " | " | 0.6 |
| 35 | " | " | 8 | " | " | 0.8 |
| 36 | " | " | 6.6 | " | " | 1.2 |
| 37 | " | " | 12 | " | 3000 | 0.3 |
| 38 | " | " | 9 | " | " | " |
| 39 | " | " | 8 | " | " | " |
| 40 | " | " | 6.6 | " | " | 0.4 |
| 41 | " | " | 12 | " | 6000 | 0.3 |
| 42 | " | " | 9 | " | " | " |
| 43 | " | " | 8 | " | " | " |
| 44 | " | " | 6.6 | " | " | " |

Next for the sake of comparison, some comparison examples will be described.

COMPARISON EXAMPLE 1

The pickup device is substantially similar to that shown in FIG. 1, but no viscous liquid is used. The Q factor is 32.

COMPARISON EXAMPLE 2

The pickup device is substantially similar to that as shown in FIG. 1, but the silicon oil (the product of Shinetsu Kagaku Kogyo K.K. sold under the trade mark KF-96) is used. The Q factor is 7.

COMPARISON EXAMPLE 3

The pickup device is substantially similar to that as shown in FIG. 1, but the silicon oil (the product of Shinetsu Kagaku Kogyo K.K. sold under the trademark of KF-96H) is used. Because of the high viscosity, the small diameter portion of the case of the first embodiment cannot be completely filled.

COMPARISON EXAMPLE 4

The pickup device is substantially similar to Example 25, but no viscous liquid is used. The Q factor is 30.

COMPARISON EXAMPLE 5

The pickup device is substantially similar in construction to Example 25 and a silicon oil with the viscosity of 10 cs (same as Example 2) is used. The Q factor is 5.

COMPARISON EXAMPLE 6

The pickup device is substantially similar in construction to Example 25 and a silicon oil (same as Example 3) with the viscosity of 12,500 cs is used. However, because of its high viscosity, the cap 34 of the case of the second embodiment cannot be completely filled.

Examples 1 through 24 and the Comparison Examples 1 and 2 were inserted into an ear while Examples 25 through 40 and Comparison Examples 4 and 5 were brought into contact with the nasal bone. All pickup devices were connected to transceivers and mutual communication was established when the noise level was 100 phons (A) in order to investigate articulation or intelligibility. The results are shown below.

| Example No. | Evaluation | Example No. | Evaluation | Example No. | Evaluation |
|---|---|---|---|---|---|
| 1 | G | 17 | G | 34 | G |
| 2 | G | 18 | G | 35 | G |
| 3 | G | 19 | G | 36 | G |
| 4 | E | 20 | G | 37 | G |
| 5 | G | 21 | G | 38 | G |
| 6 | G | 22 | G | 39 | G |
| 7 | E | 23 | G | 40 | G |
| 8 | E | 24 | G | 41 | G |
| 9 | G | 25 | G | 42 | G |
| 10 | G | 26 | G | 43 | G |
| 11 | E | 27 | E | 44 | G |
| 12 | E | 28 | G | Comp. Example | |
| 13 | G | 29 | G | 1 | P |
| 14 | G | 30 | G | 2 | P |
| 15 | G | 31 | E | 3 | P |
| 16 | G | 32 | E | 4 | P |
| | | 33 | G | | |

Key:
E = Excellent communication
G = Good communication
P = Poor communication

As described above, according to the present invention, the audio signal can be distinctly distinguished from noise even when the noise level is high.

What is claimed is:

1. A pickup device for detecting auditory vibrations transmitted through bones or other rigid members in a human body, comprising:
   a substantially rigid liquid-tight case having a cavity therein, a cantilever-like piezo-electric element having a first end fixed to said case so as to vibrate therewith when said case vibrates in response to auditory vibrations, and a free second end extending into said cavity; and a viscous liquid having a viscosity in the range 30 cs to 10,000 cs, filling said cavity so as to dampen resonant vibrations of said free end of said piezo-electric element;

said piezo-electric element having a resonant frequency greater than 1.5 KHz and exhibiting a Q in said device less than 3.

2. A pickup device as in claim 1, wherein said viscous liquid is a liquid selected from the group of viscous liquids consisting of paraffin chloride, high-molecular plasticizer, glycol, mineral oil, motor oil, organic solvent, prepolymer and epoxy resin.

3. A pickup device as in claim 1, wherein said case has a small hole for filling said cavity with said viscous liquid and a plug closing said small hole.

* * * * *